US005734908A

United States Patent [19]
Chan et al.

[11] Patent Number: 5,734,908
[45] Date of Patent: Mar. 31, 1998

[54] SYSTEM AND METHOD FOR OPTIMIZING A SOURCE CODE REPRESENTATION AS A FUNCTION OF RESOURCE UTILIZATION

[75] Inventors: Sun C. Chan, Fremont; Frederick Chow, Fremont; Shin-Ming Liu, Saratoga; Raymond W. Lo, Sunnyvale, all of Calif.

[73] Assignee: Silicon Graphics, Inc., Mountain View, Calif.

[21] Appl. No.: 455,238

[22] Filed: May 31, 1995

[51] Int. Cl.$^6$ .................................................. G06F 9/45
[52] U.S. Cl. ................................................... 395/709
[58] Field of Search ................ 364/DIG. 1 MS File, 364/DIG. 2 MS File; 395/701, 702, 703, 705, 706, 707, 708–709

[56] References Cited

U.S. PATENT DOCUMENTS

| 5,448,737 | 9/1995 | Burke et al. | 395/709 |
| 5,557,761 | 9/1996 | Chan et al. | 395/709 |

OTHER PUBLICATIONS

Peter Yan–Tek Hsu, Design of the TFP Microprocessor, Oct. 5, 1993.
Alexandru Nicolau, A Fine–Grain Parallelizing Compiler, Dec. 1986.
John L. Hennessy, Thomas R. Gross, Code Generation and Reorganization in the Presence of Pipeline Constraints, 1982.
Mark Smotherman, Shuchi Chawla, Stan Cox, Brian Malloy, Instruction Scheduling for the Motorola 88110.
Mario Tokoro, Takasi, Eiji Tamura, Ichiro Yamaura, A technique of Global Optimization of Microprograms, 1978.
Fred Chow, Minimizing Register Usage Penalty at Procedure Calls, 1988.
David Bernstein, Michael Rodeh, Global Instruction Scheduling for Superscalar Machines, 1991.

*Primary Examiner*—Robert B. Harrell
*Attorney, Agent, or Firm*—Sterne, Kessler, Goldstein & Fox P.L.L.C.

[57] ABSTRACT

A system and method for optimizing a source code representation comprising a plurality of basic blocks are described. The optimized source code representation is to be executed in a target machine. The system operates by selecting from the source code representation a basic block pair comprising a source basic block and one or more target basic blocks. An instruction in the source basic block is identified that can be moved from the source basic block to the target basic block(s) while preserving program semantics. Either the instruction or a representation of the instruction is moved from the source basic block to the target basic block(s) as a function of resource utilization of the target machine that would result from this movement.

21 Claims, 10 Drawing Sheets

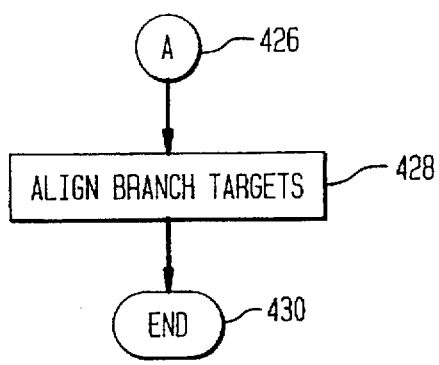
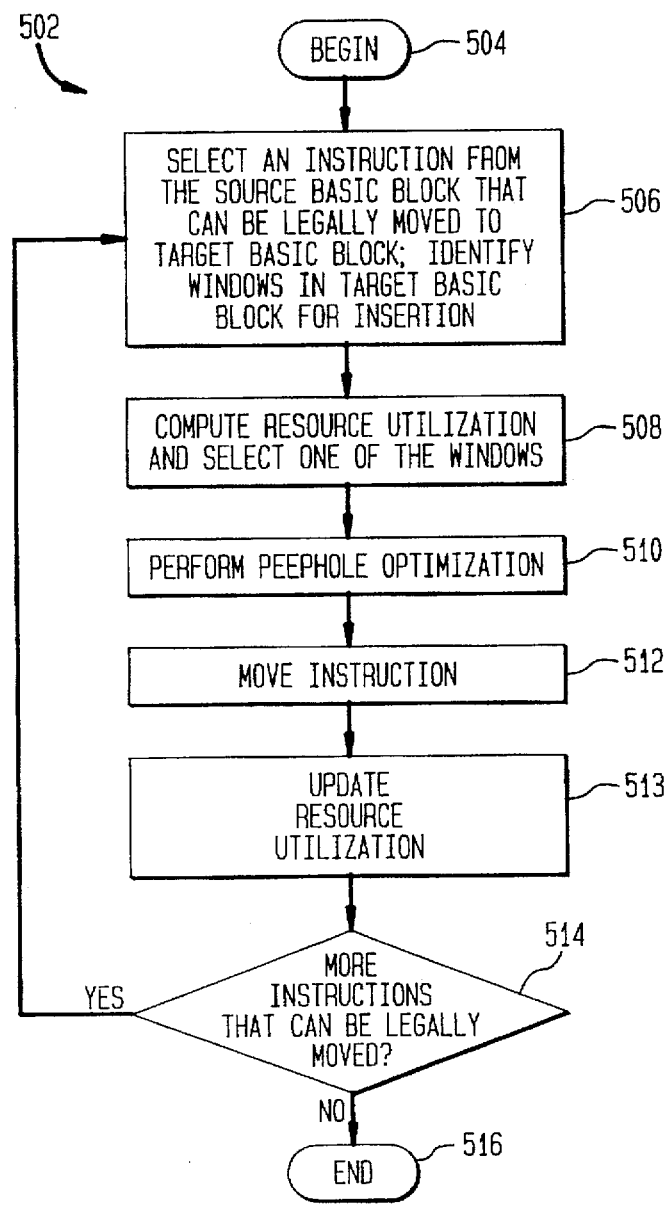

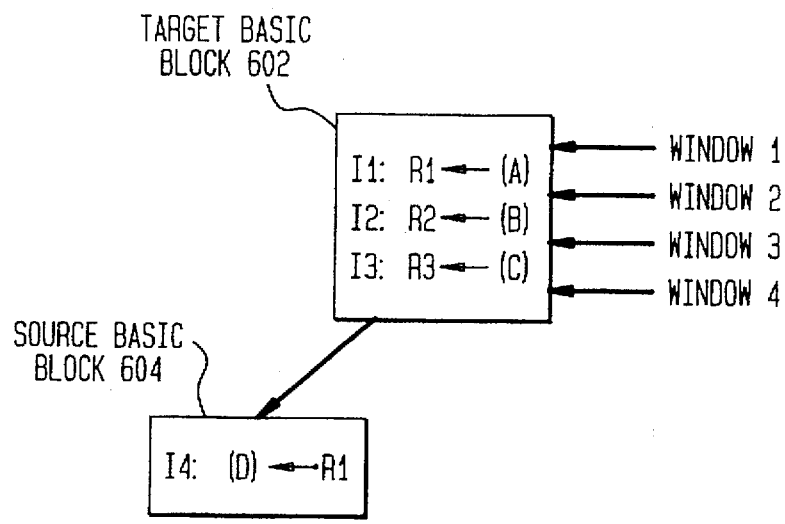

| CYCLE | LOAD/STORE 1 | LOAD/STORE 2 |
|---|---|---|
| 0 | I1 | |
| 1 | I4 | I5 |
| 2 | I7 | |

SYSTEM AND METHOD FOR OPTIMIZING A SOURCE CODE REPRESENTATION AS A FUNCTION OF RESOURCE UTILIZATION

BACKGROUND OF THE INVENTION

1. Field of the Invention

The present invention relates generally to a software compiler, and more particularly to a system and method for post-scheduling, global distribution of instructions.

2. Related Art

Modern compilers perform a sophisticated set of optimizations in their attempts to generate the best possible code for their target architectures. Such optimizations can in general be divided into two classes: machine-independent and machine-dependent optimization. Machine-independent optimizations are usually applied to an intermediate representation (IR) of a computer program. The IR is then converted into a machine dependent, lower level representation that corresponds closely to the target machine instructions. On this low-level representation, various machine-dependent optimization are applied before the final code is generated.

In recent years, computer micro-architecture has evolved rapidly in the area of multiple-issue processors. Multiple-issue processors tend to have lower tolerance (when compared to single-issue processors) for mediocre code delivered by compilers because their performance degrades significantly from peak rates if their multiple resources are not kept busy.

Accordingly, what is required is a software compiler that synthesizes code that more fully utilizes the resources provided by the underlying machine.

SUMMARY OF THE INVENTION

Briefly stated, the present invention is directed to a system and method for optimizing a source code representation comprising a plurality of basic blocks, the optimized source code representation to be executed in a target machine. The invention operates by selecting from the source code representation a basic block pair comprising a source basic block and one or more target basic blocks. An instruction in the source basic block is identified that can be legally moved from the source basic block to the target basic block(s). Either the instruction or a representation of the instruction is moved from the source basic block to the target basic block(s) as a function of resource utilization of the target machine that would result from this movement.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 4A, 4B, 5, and 11B are flow charts representing the preferred operation of the present invention; and FIGS. 6, 7A, 7B, 8A, 8B, 8C, 9A, 9B, 9C, 9D, 10A, 10B and 11A are example control flow graphs or resource usage tables used to illustrate the operation of the invention.

DETAILED DESCRIPTION OF THE PREFERRED EMBODIMENTS

1.0 Overview of the Present Invention

The present invention is directed to a software compiler that performs global instruction distribution to globally fine-tune the executable code produced for a preferably superscalar, multiple-issue processor. The fine-tuning is effected by distributing instructions from one basic block (BB) to other basic blocks (in either the forward or backward direction) according to the control flow graph of the computer program being compiled. This optimization does not involve instruction scheduling (in fact, this optimization is preferably performed after instruction scheduling). Instead, the invention models resource usage to find the best insertion points in the target basic block.

Figure 1:
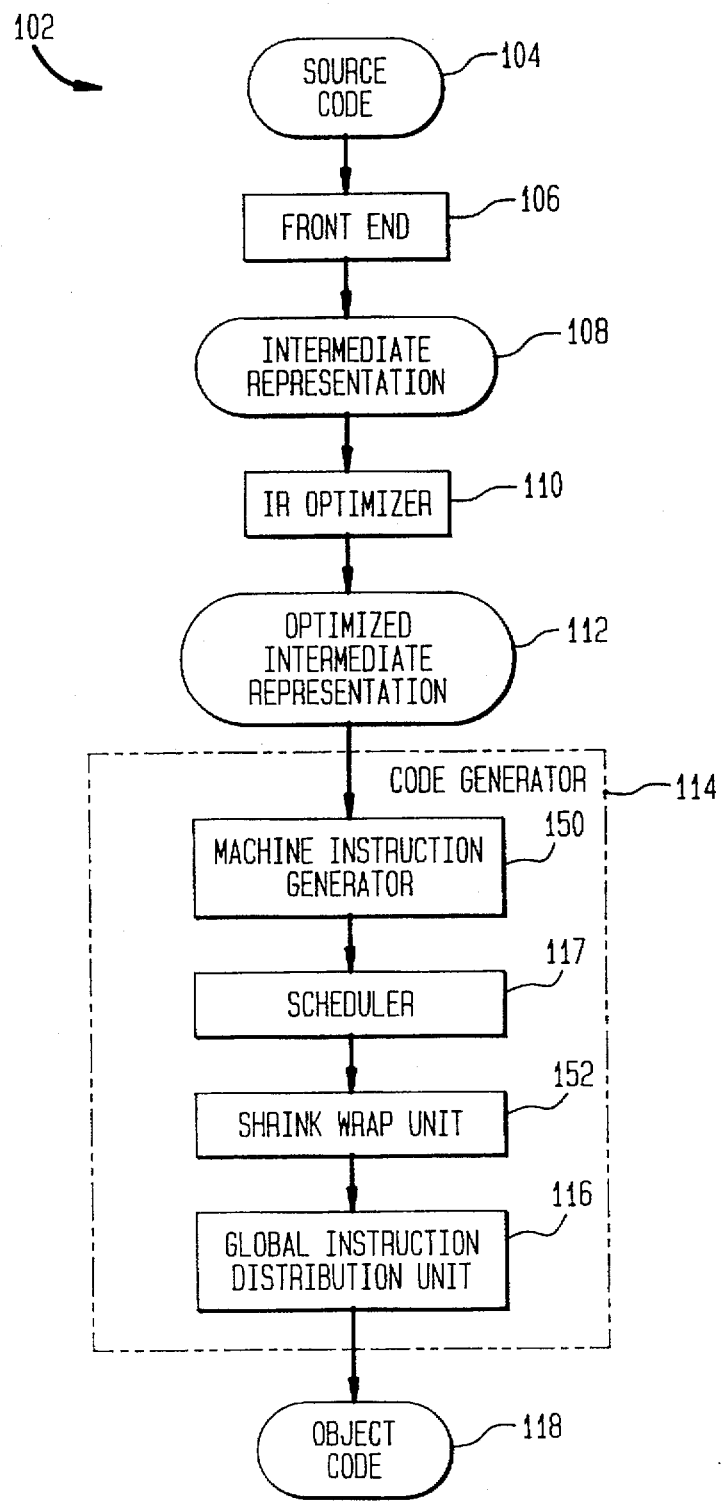
FIG. 1 is a block diagram/data flow diagram of a compiler according to a preferred embodiment of the invention.

FIG. 1 is a block diagram/data flow diagram of a software compiler 102 according to a preferred embodiment of the present invention. The software compiler 102 preferably includes a front end portion (also called the front end) 106, an intermediate instruction (IR) optimizer portion (also called the IR optimizer) 110, and a code generator portion (also called the code generator) 114.

The front end 106 receives as input source code 104 and generates an intermediate representation (IR) 108 of the source code 104. The IR 108 includes a number of basic blocks. A basic block is a sequence of intermediate instructions with a single entry point and a single exit point. A control flow graph includes one or more connected basic blocks.

Each basic block may be represented as one or more independent data dependence graphs each comprising one or more nodes. Each node generally represents an instruction which, when executed in a target machine, controls the target machine to perform one or more functions associated with the instruction (the target machine is described below). In a data dependence graph, operation of a subsequent node may be dependent on data generated and/or a variable created in a prior node (wherein the prior node is so named because it may execute prior to the subsequent node). However, operation of the prior node is not dependent on data generated and/or a variable created in the subsequent node (unless a loop exists such that the subsequent node may execute before the prior node).

The optimizer 110 optimizes the IR 108 in a preferably machine-independent manner to produce an optimized intermediate representation (IR) 112. The code generator 114 generates object code 118 from the optimized IR 112. The object code 118 (after linking by a linker, not shown) may be executed in a target machine (not shown).

The code generator 114 includes a machine instruction generator 150 that translates the optimized IR 112 into machine instructions for the target machine. A scheduler 117 in the code generator 114 schedules for execution the nodes in the data dependence graphs representing these machine instructions. In other words, the scheduler 117 determines when each machine instruction will execute relative to the execution of all of the other machine instructions. A shrink wrap unit 152 performs well known shrink wrapping of the scheduled machine instructions (shrink wrapping is described below).

The front end 106, the IR optimizer 110, the machine instruction generator 150, the scheduler 117, and the shrink wrap unit 152 are generally well known and are described in many publicly available documents, such as *Compilers: Principles, Techniques, and Tools* by Alfred V. Aho, Ravi Sethi, and Jeffrey D. Ullman (Addison-Wesley Publishing Company, Reading, Mass., March 1988), which is herein incorporated by reference in its entirety.

According to the present invention, the code generator 114 also includes a global instruction distribution (GID) unit 116. As part of the process of generating the object code 118, the GID unit 116 performs target machine-specific optimizations that enable the object code 118 (when linked and executed) to more fully utilize the resources of the target machine, thereby enhancing system performance. In particular, the GID unit 116 distributes (moves) instructions from one basic block to other basic blocks (in either the forward or backward direction). The GID unit 116 performs this instruction distribution/movement optimization when it is profitable to do so from an execution viewpoint (that is, when such instruction movement would result in faster executing and tighter resource-utilized object code 118).

The opportunities for optimization performed by the GID unit 116 arise for a number of reasons, such as:

(1) Single invocation. Many conventional optimizations performed are global in nature, and thus are compile-time intensive. As a result, they can only be invoked once instead of multiple times.

(2) Fixed ordering. The different optimization phases can only be invoked in a fixed order. Suppose optimization A creates an opportunity for optimization B. If optimization B is applied before optimization A, the opportunity will be missed.

(3) Mutually-dependent optimizations. There are situations where the best code can be generated only when two optimization phases cooperate in providing information to each other, but the two optimizations cannot be applied simultaneously. An example is the interaction between global register allocation and instruction scheduling. On the one hand, assigning fixed registers to instruction operands limits scheduling freedom. On the other hand, the unrestricted movement of instructions can extend the sizes of live range, increasing the likelihood of register spills. Thus, it is hard to achieve both optimal instruction scheduling and global register allocation.

The optimizations performed by the GID unit 116 of the present invention can be generalized under the theme of Global Instruction Distribution (GID). GID results in disciplined distribution of instructions globally within the entire procedure to utilize idle resources and reduce the total number of cycles needed to execute the entire program. Preferably, the optimizations performed by the GID unit 116 represent the final phase of the compiler 102.

Figure 2:
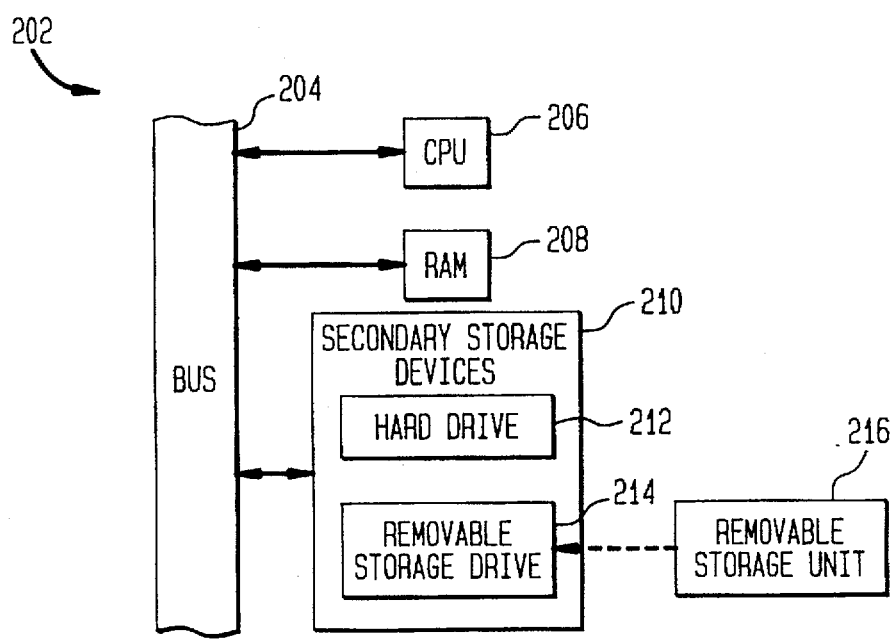
FIG. 2 is a block diagram of a preferred computer system in which the compiler of FIG. 1 operates.

FIG. 2 is a block diagram of a computer system 202 in which a software compiler 102 of the present invention preferably operates. Alternatively, the present invention includes the software compiler 102 in combination with the computer system 202.

The computer system 202 includes one or more processors, such as central processing unit (CPU) 206, connected to a bus 204. Also connected to the bus 204 is a random access memory (RAM) 208 and one or more secondary storage devices 210, such as a hard drive 212 and a removable storage drive 214. The removable storage drive 214 may include, for example, a tape drive, a floppy drive, a CD-ROM drive, etc. A removable storage unit 216 (such as a storage tape, a floppy disk, a CD, etc.), having control logic (software) and/or data stored therein, may be installed into and accessed by the removable storage drive 214 in a well known manner. The software compiler 102, the source code 104, the IR 108, the optimized IR 112, and/or the object code 118 reside (i.e., are stored) in the RAM 208, the hard drive 212, and/or the removable storage unit 216. The software compiler 102 is preferably a computer program that includes instructions which, when executed in the computer system 202, enable the computer system 202 to perform particular functions.

In a preferred embodiment of the present invention, the computer system 202 is the Power Challenge computer system manufactured by Silicon Graphics Inc. of Mountain View, Calif., although other computer systems could alternatively be used to implement the computer system 202.

2.0 Target Machine

As discussed above, the GID unit 116 performs target machine-specific optimizations that enable the object code 118 (when linked and executed) to more fully utilize the resources of the target machine, thereby enhancing system performance. For purposes of illustration, the target machine is described herein as being the MIPS R8000 processor. The optimizations performed by the GID unit 116 as described herein are generally specific to processors having the features of the MIPS R8000 processor, although the operation of the GID unit 116 is also applicable to other processors as will be apparent to persons skilled in the relevant art(s).

The MIPS R8000 processor is a 4-issue superscalar RISC processor and includes two arithmetic logic units (ALU), two floating point units and two load/store units. In each cycle, the four instructions are executed in any of these six functional units. Branches are handled by the ALUs. Some instructions, such as branch, shift and integer store, cannot be repeated in the same cycle. Most integer instructions complete in one cycle; some long latency operations (e.g. div, mult, sqrt) take multiple cycles to complete.

The MIPS R8000 provides in-order dispatch of up to four instructions each cycle regardless of instruction alignment most of the time. The only exception is when the target of a branch is not quad-word aligned. In this case, the dispatch is reduced by (word-address modulo 4) instructions. The processor does no speculative execution of instructions across branch boundaries. However, it has a 1 kilobyte branch target buffer for branch prediction such that a correctly-predicted branch has zero branch penalty.

The R8000 has a branch delay slot for backward compatibility with earlier MIPS processors. Unlike its predecessors, there is no requirement to dispatch a branch instruction and its delay slot in different cycles, provided that there are sufficient resources and the instruction in the delay slot has no interlock with instructions dispatched earlier. Furthermore, when a branch is correctly predicted as not taken, the three instructions following the branch can be dispatched in the same cycle provided that the resource and interlock constraints are not violated.

The MIPS R8000 processor is further described in Hsu, P., "Designing the TFP Microprocessor", *IEEE Micro*, April 1994, pp. 23–33, incorporated herein by reference in its entirety.

3.0 Basic Block Pairs

As noted above, the GID unit 116 performs global instruction distribution optimization by moving instructions between basic blocks. According to the present invention, there are four types of basic block pairs which are eligible for instruction movement: circular, equivalent, code duplication, and speculative. It is noted that a basic block "pair" comprises a source basic block (one part of the pair) and one or more target basic blocks (the other part of the pair), where one or more instructions are moved from the source BB to the target BB(s).

Multiple basic blocks are circular and thus eligible for instruction movement if one of the basic blocks (which becomes the source basic block) always executes after the other basic block or another basic block via a control loop (these become target basic blocks). The source basic block must be at the tail end of a back arc (that is, the control loop). One of the target basic blocks is at the head end of the back arc. In the case of the circular classification, instructions from the source basic block must be moved to all basic blocks which precede it in execution. Referring to an example control flow graph 302 in FIG. 3, for example, basic block BB1 is eligible for aggregate instruction movement under the circular classification (with basic blocks BB0 and BB4 being the target BBs and basic block BB1 being the source BB) because basic block BB1 is always processed after basic block BB0 or basic block BB4 via a control loop. If instructions are moved from basic block BB1 to basic block BB0, then the same instructions must also be moved to basic block BB4.

Figure 3:
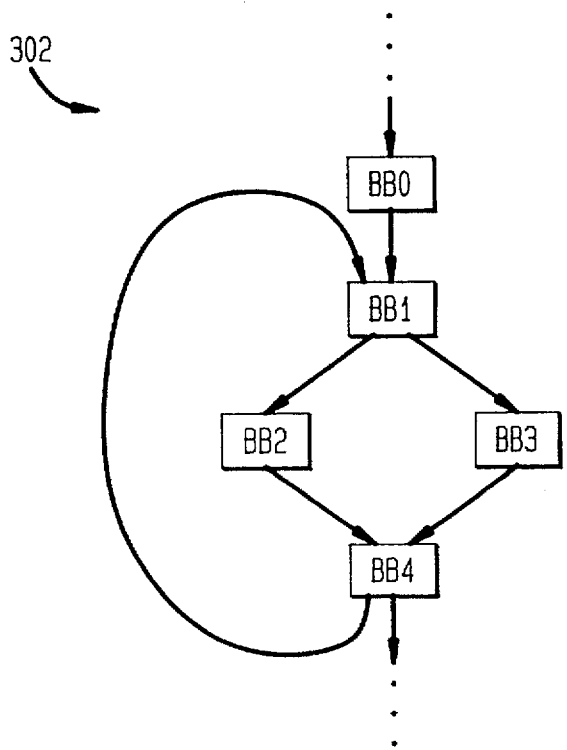
FIG. 3 is a control flow graph used to illustrate different types of instruction movement.
Figure 4A:
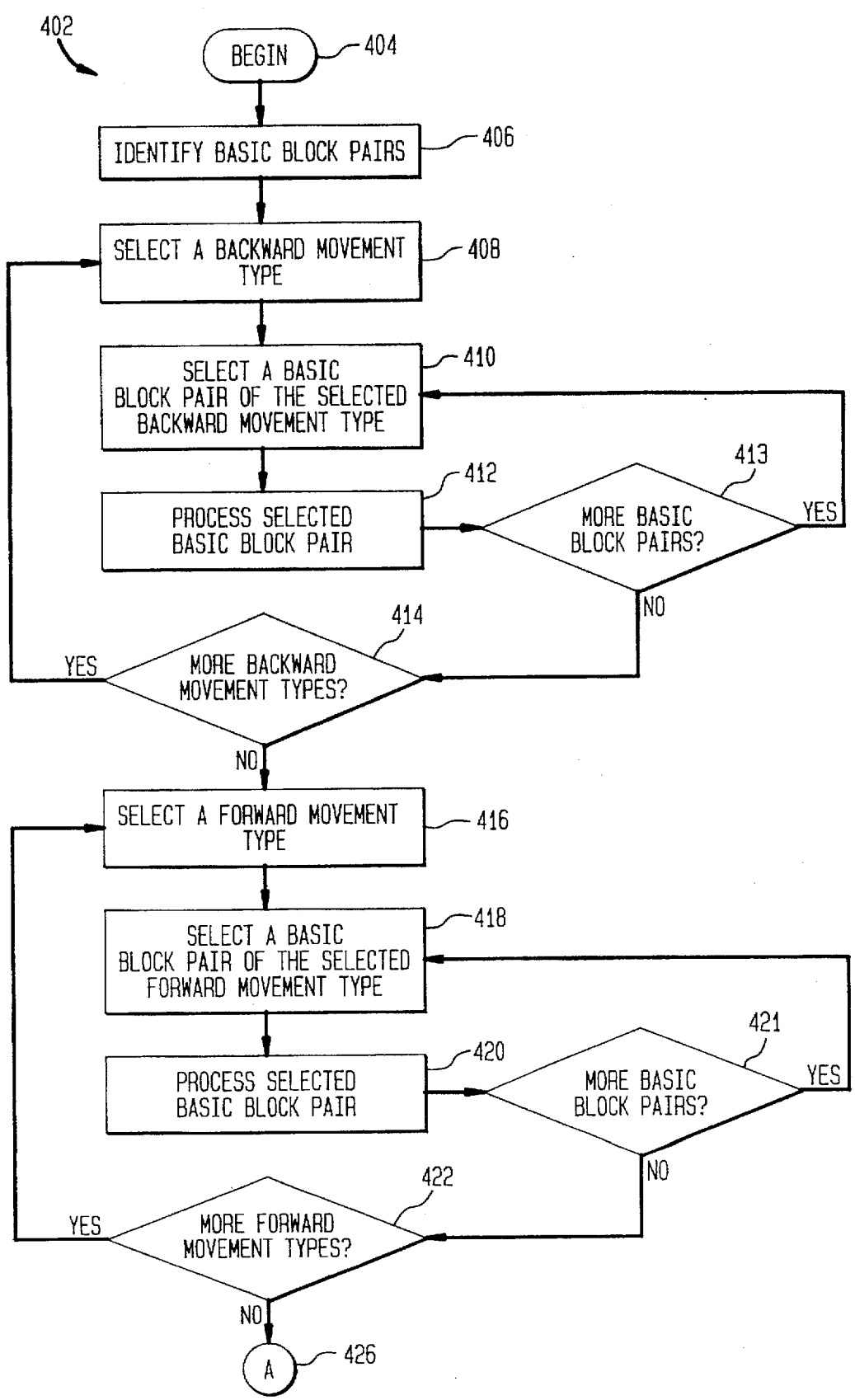

Two basic blocks are equivalent and are thus eligible for instruction movement if the first basic block is provably always processed after the processing of the second basic block, and the second basic block is provably always processed before the processing of the first basic block. Referring to FIG. 3, basic blocks BB1 and BB4 are equivalent, because basic block BB4 is always processed after the processing of basic block BB1. This is true, even though basic block BB2 or basic block BB3 is processed between the processing of basic blocks BB1 and BB4.

Multiple basic blocks are eligible for instruction movement under the code duplication classification if one of the basic blocks is provably always processed after the processing of the other basic block or one or more additional basic blocks. In the case of code duplication, instructions from the source basic block must be moved to all of the basic blocks which may execute before the source basic block. Referring to FIG. 3, basic blocks BB2 and BB4 are eligible for aggregate instruction movement under the code duplication classification (with basic blocks BB2 and BB3 being the target BBs and basic block BB4 being the source BB) because basic block BB4 is always processed after basic block BB2 or basic block BB3. If instructions are moved from basic block BB4 to basic block BB2, then the same instructions must also be moved to basic block BB3.

Two basic blocks are eligible for instruction movement under the speculative classification if one of the basic blocks may be processed after the other basic block is processed. For example, in FIG. 3 basic blocks BB1 and BB2 are speculative (with basic block BB1 being the target BB and basic block BB2 being the source BB) since basic block BB2 may be processed after basic block BB1 (note that basic block BB3, rather than basic block BB2, may be processed after basic block BB1). Similarly, basic blocks BB1 and BB3 are speculative and are thus eligible for aggregate instruction movement.

The above description of types of basic block pairs applies to the backward movement of instructions. For forward instruction movement, the types of basic block pairs can be similarly derived by viewing the control flow graph in an inverted fashion (for example, BB4 would be at the top and BB0 would be at the bottom in the graph 302 of FIG. 3).

4.0 Movement of Instructions

The GID unit 116 distributes instructions by moving individual instructions across basic block (BB) boundaries. The global movement of instructions is performed based on the control flow graph of the program. GID performs a large repertoire of instruction movement. The different categories of movement are invoked and applied successively to individual basic blocks in the procedure. The GID unit 116 terminates when all movement types have been applied to all basic blocks. No repeated application of the same movement type to the same basic block is necessary. As a result, the number of applications is linear with respect to the size of the procedure.

The GID unit 116 has two passes: the first pass performs backward instruction distribution (where instructions are moved toward the entry point of a function), and the second pass performs forward instruction distribution (where instructions are moved toward the exit point of a function), with respect to the control flow of the program. Except for equivalent motion, each movement step only moves instructions to adjacent blocks. The basic blocks are placed in a list constructed by a post-order traversal of the control flow graph. Instruction distribution is applied by iterating through this list, considering each basic block as a target block. Since some motion types are more important than others, we complete one type of motion by iterating through the list for that motion type before attempting the next motion type. Circular motion is applied first, because it deals with loops, and thus is most important. Equivalent motion is next in importance, because it does not increase code size. Duplicating motion is applied next. Speculative motion is applied last because it may cause overhead for the alternative path. It is noted that this ordering is relevant to the preferred embodiment only. Other orderings can alternatively be used.

For backward distribution, we preferably start at the head of the list corresponding to the entry block of the procedure; for forward distribution, we preferably start at the tail of the list. As a result, each instruction will preferably only be moved at most once in each backward or forward phase. Other operational approaches adapted for specific implementations and goals for traversing through the list in the backward and forward directions will be apparent to persons skilled in the relevant art(s).

As described above, the GID unit 116 has an impact on both forward and backward movement. Backward movement is applicable to all four basic block pairs (described above). However, according to a preferred embodiment of the invention, forward movement is only applicable to the following basic block pairs: equivalent, speculative, and code duplication. All possible movements for the example scenario presented in FIG. 3 are listed in Table 1.

TABLE 1

| Processing Sequence | Movement Type | Source BB | Target BBs |
| --- | --- | --- | --- |
| 1 | Circular Backward | BB1 | BB0,BB4 |
| 2 | Equivalent Backward | BB4 | BB1 |
| 3 | Duplicating Backward | BB4 | BB2,BB3 |
| 4 | Speculative Backward | BB2 | BB1 |
| 5 | Speculative Backward | BB3 | BB1 |
| 6 | Equivalent Forward | BB1 | BB4 |
| 7 | Speculative Forward | BB2 | BB4 |
| 8 | Speculative Forward | BB3 | BB4 |
| 9 | Duplicating Forward | BB1 | BB2,BB3 |

5.0 Operation of the GID Unit

The operation of the GID unit 116 shall now be further described with reference to a flowchart 402 shown in FIGS.

4A and 4B. Flowchart 402 represents the manner in which the GID unit 116 performs GID optimization preferably on the machine instructions received by the GID unit 116 from the shrink wrap unit 152. As discussed above, the GID unit 116 preferably operates as the last phase in the compilation process. However, it should be understood that the GID unit 116 could alternatively operate during other times of the compilation process. Flowchart 402 begins with step 404, where control immediately passes to step 406.

In step 406, the GID unit 116 identifies all basic block pairs in the optimized intermediate representation 112. The types of basic block pairs are described above.

In step 408, the GID unit 116 selects one of the backward movement basic block pair types. As discussed above, all four basic block pair types are eligible for backward movement. Preferably, the GID unit 116 processes these basic block pair types in the following order (it should be understood that the invention is not limited to this ordering; the invention also operates with other orderings): circular, equivalent, duplicating, and speculative. Thus, in the first iteration of the loop containing steps 408–414, the GID unit 116 selects the circular basic block type. In subsequent iterations of the loop containing steps 408–414, the GID unit 116 selects the equivalent type, then the duplicating type, and then the speculative type.

In step 410, the GID unit 116 selects one of the basic block pairs of the selected backward movement type.

In step 412, the GID unit 116 processes the selected basic block pair. This selected basic block pair includes a source BB (one part of the pair) and one or more target BBs (the other part of the pair). Thus, in step 412, the GID unit 116 potentially moves one or more instructions from the source BB to the target BB(s). The manner in which the GID unit 116 performs step 412 is described below.

In step 413, the GID unit 116 determines whether there are additional basic block pairs of the selected backward movement type left to process. If there are such basic block pairs left to process, then control returns to step 410. Otherwise, step 414 is performed.

In step 414, the GID unit 116 determines whether there are additional backward movement types left to process. If there are more backward movement types left to process, then control returns to step 408. Otherwise, step 416 is performed.

In step 416, the GID unit 116 selects one of the forward movement basic block pair types. As discussed above, preferably, only three of the four basic block pair types are eligible for forward movement: equivalent, speculative and duplicating. Preferably, the GID unit 116 processes these basic block pair types in the following order (it should be understood that the invention is not limited to this ordering; the invention also operates with other orderings): equivalent, then speculative, then duplicating.

In step 418, the GID unit 116 selects one of the basic block pairs of the selected forward movement type.

In step 420, the GID unit 116 processes the selected basic block pair. This selected basic block pair includes a source BB (one part of the pair) and one or more target BBs (the other part of the pair). Thus, in step 420, the GID unit 116 potentially moves one or more instructions from the source BB to the target BB(s). The manner in which the GID unit 116 performs step 420 is described below.

In step 421, the GID unit 116 determines whether are additional basic block pairs of the selected forward movement type left to process. If there are such basic block pairs left to process, then control returns to step 418. Otherwise, step 422 is performed.

In step 422, the GID unit 116 determines whether there are additional forward movement types left to process. If there are more forward movement types left to process, then control returns to step 416. Otherwise, step 428 is performed.

In step 428, the GID unit 116 performs branch target alignment, which represents another type of optimization of the present invention. The manner in which the GID unit 116 performs step 428 is described below.

After step 428 is performed, operation of flowchart 402 is complete, as indicated by step 430.

6.0 Processing a Basic Block Pair

The manner in which the GID unit 116 processes the selected basic block pair in step 412 shall now be described with reference to a flowchart 502 in FIG. 5. Note that the algorithm performed in step 412 is identical to that performed in step 420. Thus, the following description applies equally well to step 420. Flowchart 502 begins with step 504, where control immediately passes to step 506.

In step 506, the GID unit 116 identifies an instruction (if any) from the source basic block (of the selected basic block pair) that can be legally moved to the target basic block(s) (of the selected basic block pair). An instruction movement is legal as long as it is not illegal. There are a number of illegal instruction movements (although the set of illegal instruction movements is implementation dependent):

(1) Instruction type: There are certain types of instructions that should preferably never be moved. Since we do not want to alter the structure of the control flow graph, call and branch instructions are never considered for movement. Instructions that have side effects (e.g., divides and stores) are never moved speculatively. Instructions that may cause unrecoverable faults (exceptions) also cannot be moved speculatively. However, the linker may provide support that allows null pointer differences to be tolerated, so that loads can be moved more freely (this is implementation specific).

(2) Register dependence. Instructions that have an input dependence should not be moved such that their input dependence is violated. For example, consider the following two instructions:

I1: R1<--(a)

I2: R2<--R1

In instruction I1, the contents of location a is stored in register R1. In instruction I2, the contents of register R1 is stored in register R2. Instruction I2 cannot be moved before instruction I1, because then the incorrect value could potentially be stored in register R2.

Also, instructions that have an output dependence should not be moved such that their output dependence is violated. For example, consider the following instructions:

I3: r1<--(a)

I4: r1<--(b)

I5: (c)<--r1

Instruction I4 cannot be moved before instruction I3, because then the wrong value could potentially be stored in location c.

Further, instructions that have an anti-dependence should not be moved such that their anti-dependence is violated. For example, consider the following:

I6: (a)<-r1

I7: r1<-(b)

Instruction I7 cannot be moved before instruction I6, because then the improper value would potentially be stored in location (a).

(3) Memory aliases. Memory aliases involving load and store instructions should not be moved such that their memory aliases are violated. Consider the following instructions:

I8: store r3, (r4)

I9: load r2, (r4)

Instruction I8 operates to store the contents of register r3 in the location indicated by the address in register r4. Instruction I9 operates to load the contents of the location indicated by the address in register r4 into register r2. Instruction I9 cannot be moved before instruction I8, because then the wrong value would potentially be loaded into register r2.

(4) Speculative/Circular motions. With regard to speculative and circular pairs, stores should generally not be moved (it may be possible to move some compiler generated temporaries). For example, moving a store may be illegal if an alternate path (one not involving the source BB) is taken. Also, it is necessary to check for exposed use. For example, an instruction referencing a register should not be moved if a potential alternate path (one not involving the source BB) includes an exposed use of that register.

In addition to identifying an instruction from the source basic block that can be legally moved to the target basic block(s), the GID unit 116 in step 506 also identifies windows in the target basic block(s) for legal insertion of the instruction (these are called the "legal windows" for reference purposes). Consider the example scenario presented in FIG. 6. In this example, there are four possible windows in the target basic block 602 for insertion of instruction I4 from the source basic block 604. Note that instructions I4 and I1 are input dependent on one another. Thus, instruction I4 cannot be legally moved into window 1, as that would violate the input dependence between instructions I1 and I4. No such restrictions exist with windows 2, 3, and 4. Thus, in step 506, the GID unit 116 identifies that instruction I4 can be legally moved into window 2, 3, or 4 (these are the legal windows).

In step 508, the GID unit 116 performs a resource utilization computation and selects one of the legal windows based on this computation. Step 508 shall now be described in detail.

The main objective of GID is to use the idle resources in one basic block to perform useful work originally designated in other basic blocks, so that the total number of cycles required to execute the entire program is reduced. A profitability test is performed in step 508 according to this objective. For equivalent motion, movement is beneficial if the total number of cycles needed to execute the source and target basic blocks do not increase. For speculative motion, the movement is beneficial if the cycles needed to execute the target basic block does not increase. For duplicating motion, the movement is beneficial if the cycles needed to execute each of the target basic blocks does not increase. For circular motion, the movement is beneficial if the cycles needed to execute the target basic block that is inside the loop does not increase. If more than one insertion point is available (i.e., if there are multiple legal windows), then the GID unit 116 picks the earliest one when performing backward distribution, and the latest one when performing forward distribution, so that more instructions can be moved subsequently to the same block.

In selecting one of the legal windows, it is necessary to model the resource usage along the schedule of instructions in the target basic block. The GID unit 116 scans the instructions in the target basic block, keeps track of the resources used by each instruction in each of its stages, and builds a matrix (called the resource usage table) that represents, for each cycle in the target basic block, the total resource utilization. Any free resource at any cycle in the block may be put to use by making it execute an instruction distributed from another block. If the resource needed by the imported instruction at each of its pipe stages is free, the instruction can be inserted without affecting the total cycle count of the entire block.

Consider an example scenario presented in FIGS. 7A and 7B. FIG. 7A illustrates an example resource usage table 702 for a target basic block. The utilization of resources R0, R1, R2, and R3 during cycles 0–4 are shown. For example, during cycle 0 resources R0 and R1 are utilized by instruction I1. FIG. 7B represents the resource requirements of instruction I4 from the example source basic block. Instruction I4 requires resource R2 during a first cycle, and resource R3 during a second cycle. There are two windows in the target basic block where the resource requirements of instruction I4 can be satisfied: a first window comprising cycles 0 and 1, and a second window comprising cycles 2 and 3. If both the first and second windows are legal windows, then the GID unit 116 in step 508 selects the first window for backward movement, and selects the second window for forward movement.

In step 510, the GID unit 116 performs peephole optimization. Step 510 shall now be discussed in detail.

With multiple function units, there are cases where the same operation can be made to be performed on a different type of function unit by changing the instruction type, so as to avoid resource conflicts. For example, the compiler 102 preferably distinguishes between three kinds of no-op's for the R8000, according to whether the no-op is handled by the integer unit, floating-point unit or load/store unit. When a no-op needs to be inserted as the result of branch target alignment (discussed in detail below), it is necessary to use the no-op for the function unit that is idle. This is an example of peephole optimization.

Peephole optimization is traditionally applied to instructions occurring in the same basic block. Additional peepholing opportunities are possible when instructions are imported from outside the block. By changing the form of instruction to be used in insertion, GID's profitability function provides the effects of cross-basic-block peephole optimization.

One of the peephole optimizations performed by GID is load-store elimination. After moving a load or store instruction to a basic block, the value being accessed may already be in a register, and the moved instructions may be able to be eliminated or transformed into a move instruction that does not reference memory (see the example presented in FIGS. 8A–8C, discussed below). Table 2 gives GID's preferred peephole rules for loads and stores referencing the same memory location with same or different register operand. Other peephole rules for GID will be apparent to persons skilled in the relevant art(s) based on the discussion herein.

TABLE 2

| Relevant instruction in target BB (if one exists) | instruction from source BB to be inserted | possible actions |
| --- | --- | --- |
| load rx | load rx | delete the instruction to be moved |
| store rx | load rx | delete the instruction to be moved |
| store rx | store rx | delete the instruction to be moved |
| load rx | load ry | 1. no movement; 2. insert 'load ry'; or 3. insert 'move ry, rx' |
| store rx | load ry | 1. no movement; 2. insert 'load ry'; or 3. insert 'move ry, rx' |
| store rx | store ry | delete 'store rx', or insert 'store ry' |

Figure 8A:
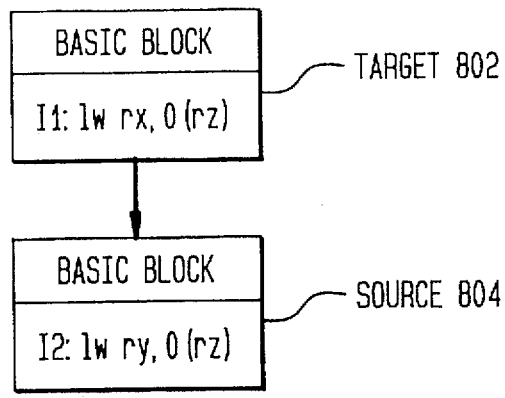
Figure 8B:
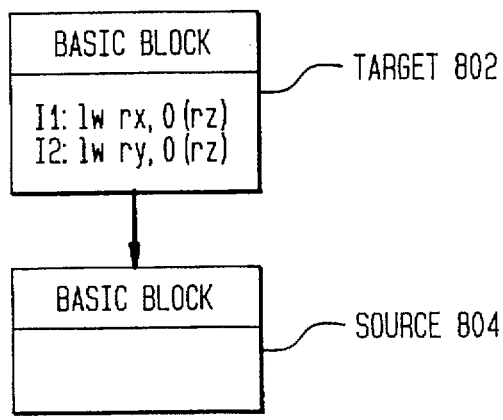
Figure 8C:
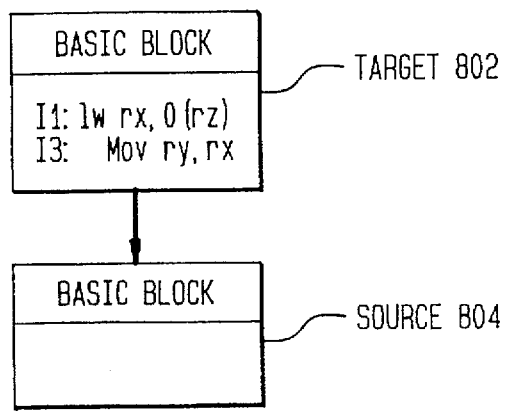

Peephole optimization as described above will be further illustrated by an example presented in FIGS. 8A–8C. FIG. 8A illustrates a target BB 802 and a source BB 804. As shown in FIG. 8B, the GID unit 116 has moved instruction I2 from the source BB 804 to the target BB 802. However, to do this, a load/store unit must be available during the pertinent cycles. This movement would not be possible if a load/store unit was not available. As shown in FIG. 8C, the GID unit 116 has instead converted instruction I2 into an equivalent instruction I3, and moved instruction I3 into the target BB 802. The instruction I3 involves a move operation, which is handled by an ALU, not a load/store. Thus, this peephole optimization is preferred since it frees up a load/store unit.

In step 512, the GID unit 116 moves the instruction as so indicated by the operation of steps 506, 508, and 510. In step 513, the GID unit 116 updates resource utilization information (i.e., the information in the resource usage tables).

In step 514, the GID unit 116 determines whether there are additional instructions in the source BB that can be legally moved to the target BB(s). If there are such instructions, then control returns to step 506. Otherwise, flowchart 502 is complete, as indicated by step 516.

The profitability criteria employed by the invention is not strict in the sense that we allow movement even when there is no net cycle reduction considering that movement alone. The motivation is that even though a single movement does not result directly in cycle reduction, it may enable other cycle-reducing movement by leaving behind idle resources so that other instructions can be moved there.

As mentioned earlier, GID performs both backward and forward distribution, so as not to miss profitable distribution opportunities in either direction. The forward distribution pass that is performed after the backward distribution pass also serves a second purpose: it reverses any useless speculative motion that may have been resulted from the backward distribution pass. Useless speculative motion increases resource utilization without decreasing the total cycle count of the program, and could have a negative impact on the program execution time when cache effects are considered. Thus, the backward and forward distribution passes cooperate to ensure that speculative motion is performed only if the total cycle count can be reduced.

7.0 Branch Delay Slot Optimization

Filling branch delay slots is an important post-scheduling optimization that should be performed on any architecture that has branch delay slots. Many branch delay slots can be filled by the basic block scheduler by moving instructions that occur earlier in the same block to the delay slots. Filling branch delay slots using instructions from other basic block is part of GID's functionality, because an empty delay slot represents idle resources that can be utilized by importing instructions from other basic blocks. Apart from filling empty branch delay slots, GID also looks for situations where the instruction originally in the filled branch delay slot can be inserted earlier in the block without incurring extra cycles, so that the delay slot can be filled by instructions from other blocks.

If an instruction still cannot be found to fill the branch delay slot due to dependency constraints, the branch-likely instructions may be used. The delay slot of a branch-likely instruction is nullified if the branch is not taken, so that any instruction from the branch target can be used to fill the branch delay slot. While using branch-likely instructions enables the branch delay slot to be filled, it does not help the performance of the fall-through path. In addition, if the delay slot is filled with an instruction that has resource conflict with the first few instructions in the fall-through path, it will hurt the performance of the fall-through path. As a result, for a branch where fall-through is determined to occur more frequently, GID's profitability test additionally computes the cycle count of the fall-through path as one of its criteria in deciding whether to fill the branch delay slot via the branch-likely instructions. The cycle count of the fall-through path is preferably represented using an extended resource usage table that takes into account a portion of the basic block containing the fall-through path.

Figure 9A:
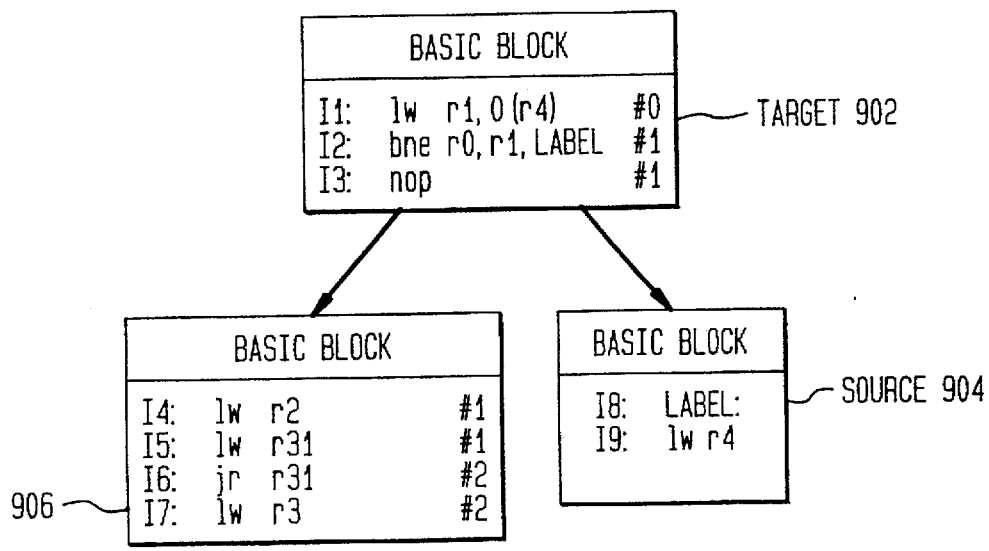
Figure 9B:
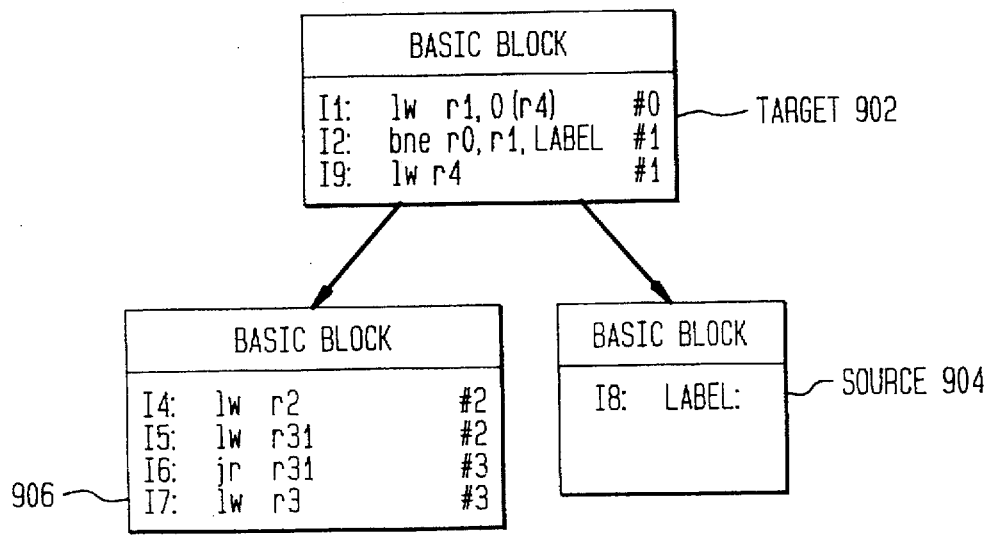

Consider the example presented in FIGS. 9A–9D. FIG. 9A presents an example scenario containing a target BB 902 (containing a branch delay slot at instruction I3), a source BB 904, and a basic block 906 containing a fall-through path of the target BB 902. As shown in FIG. 9B, instruction I9 from the source BB 904 has been moved into the branch delay slot in the target BB 902. However, this movement results in longer execution time by the target BB 902 and the basic block 906 (in those cases when this fall-through path is taken), since there are not enough load/store units to accommodate the load instructions in instructions I9, I4, and I5 (the cycles in which each instruction executes is indicated next to each instruction) (recall that the preferred target processor contains only two load/store units).

Figures 9C, 9D:
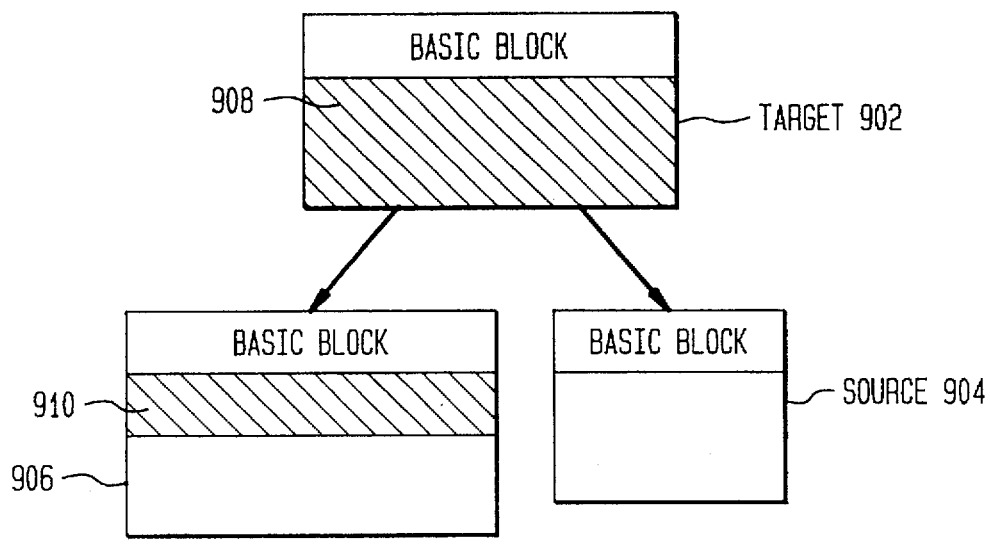

To avoid and solve this problem, the GID unit 116 generates an extended resource usage table 920 (FIG. 9D) that includes resource usage information 908 from the target BB 902, as well as a portion of the resource usage information 910 from the basic block 906 containing the fall-through path (FIG. 9C). The extended resource usage table 920 represents the scenario presented in FIG. 9A, before the move of FIG. 9B has been performed. The extended resource usage table 920 indicates that both load/store units are utilized during cycle 1 by instructions I4 and I5. Accordingly, the GID unit 116 will not move instruction I9 to the target BB 902, since that would push instructions I4 and I5 down to cycle 2, thereby resulting in longer execution time.

8.0 Shank Wrap Optimization

Figure 10A:
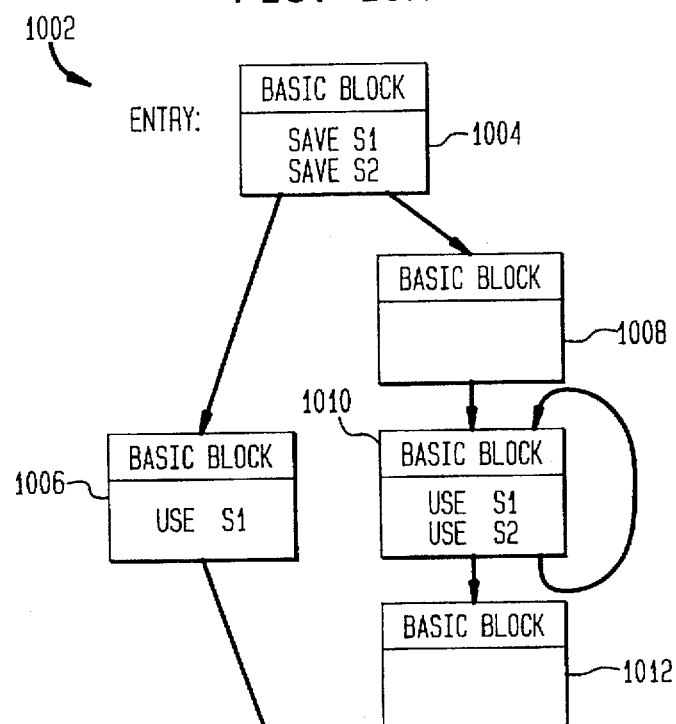
Figure 10B:
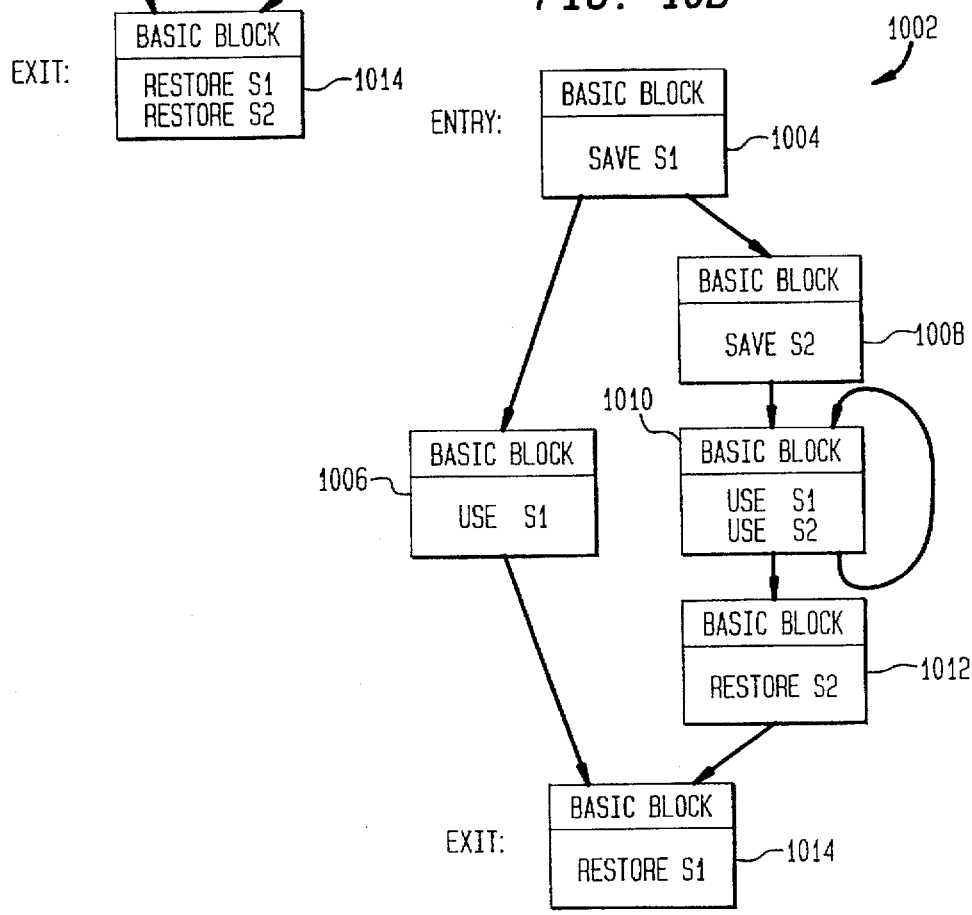

Linkage convention specifies that the contents of a fixed set of registers be preserved across calls. This set of registers is called the "callee-saved registers." Before a callee-saved register is used the first time within a procedure, its content must be saved. After its last use, its content must be restored before exiting the procedure. The earlier code generation and scheduling phases of the compiler introduce register usages. Once all register usages have been determined, code to save the callee-saved registers is inserted at procedure entry, and corresponding code to restore their previous contents is inserted at procedure exits. An optimization called register shrink-wrapping is applied in a well known manner by the shrink wrap unit 152 to optimize the placements of the save and restore code so that they only cover regions where the callee-saved registers are used. This is depicted in FIGS. 10A and 10B. As shown in FIG. 10A, save and restore instructions have been inserted into basic blocks 1004 and 1014, respectively. As shown in FIG. 10B, the save and restore instructions for S2 have been moved to basic blocks 1008 and 1012, respectively, since basic block 1006 does not use S2. For further information on this conventional optimization, see Chow, F., "Minimizing Register Usage Penalty at Procedure Calls", *Proceedings—SIGPLAN '88 Conference on Programming Language Design and Implementation*, pp. 85–94, incorporated herein by reference in its entirety.

Such save and restore code usually occurs as clusters, not distributed evenly through the program. A different set of loads and stores is caused by register spills and reloads, which occurs whenever the code generator runs out of registers in the process of code generation and scheduling. Though their distribution is less clustered, they may also cause non-uniform resource usage in blocks where they appear. There is opportunity to find better global placements for these instructions by locating idle resources to perform the loads and stores. As part of its normal operation (as described above), the GID unit 116 automatically performs such an optimizing task. In determining the best insertion points for these instructions, the GID unit 116 distributes them to other basic blocks, thus balancing the resource usage along the control flow of the program. Thus, as part of its operation, the GID unit 116 may move the save and restore instructions as shown in FIG. 10B to other basic blocks to most efficiently and effectively take advantage of available resources.

9.0 Aligning Branch Targets

As discussed above, the GID unit 116 aligns branch targets (step 428). This optimization shall now be described in detail.

The branch target alignment restriction in R8000's instruction dispatch unit (and in other processors), as described above, presents another opportunity for the GID unit 116 to improve resource utilization. When the target of a branch is not quad-word-aligned, it can be made to be quad-word-aligned by inserting up to 3 no-op instructions before it (or different numbers of no-op instructions depending on the limitations of the target processor). This optimization is preferably done as the last step in the code generation process, when the sizes of all basic blocks have been fixed. Consequently, we add a last phase in GID specifically to perform this task.

Though aligning a branch target speeds up the branch, it may penalize the path that falls through into the branch target because it has to execute the no-op instructions. To minimize such situations, the no-op's need to be distributed to places where they are either never executed or do not cause extra cycles.

GID's branch target alignment phase operates on the code sequentially in program layout order. It performs no-op insertion one alignment window at a time. An alignment window is the block of code in program layout order from the previously aligned branch target to the next branch target to be aligned. In performing no-op distribution within an alignment window, the simplest case occurs when the alignment window contains an unconditional branch. In this case, all the no-ops can be inserted right after the unconditional branch as unreachable code. If there is no unconditional branch, GID looks for insertion points within the window such that the no-ops inserted will not cause extra cycles. If it cannot find enough such insertion points, GID has to choose between not aligning the branch target, or aligning the branch target and penalizing the path that falls through into it. In this case, GID's action depends on the nature of the branch target. If the branch target is the head of a loop, it has much higher probability of being branched to than being fallen-through to, so GID chooses to align the branch target by inserting no-op's before it. Otherwise, GID will not align the branch target.

Figure 11A:
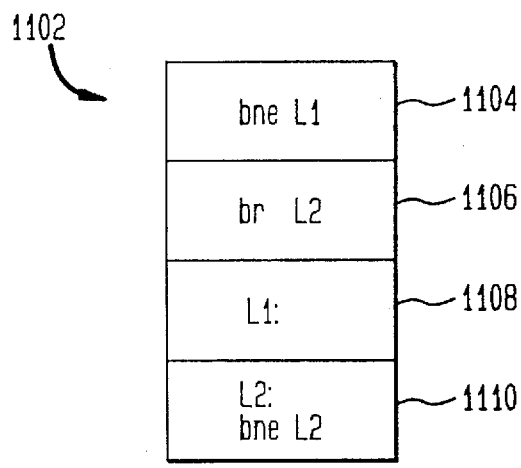
Figure 11B:
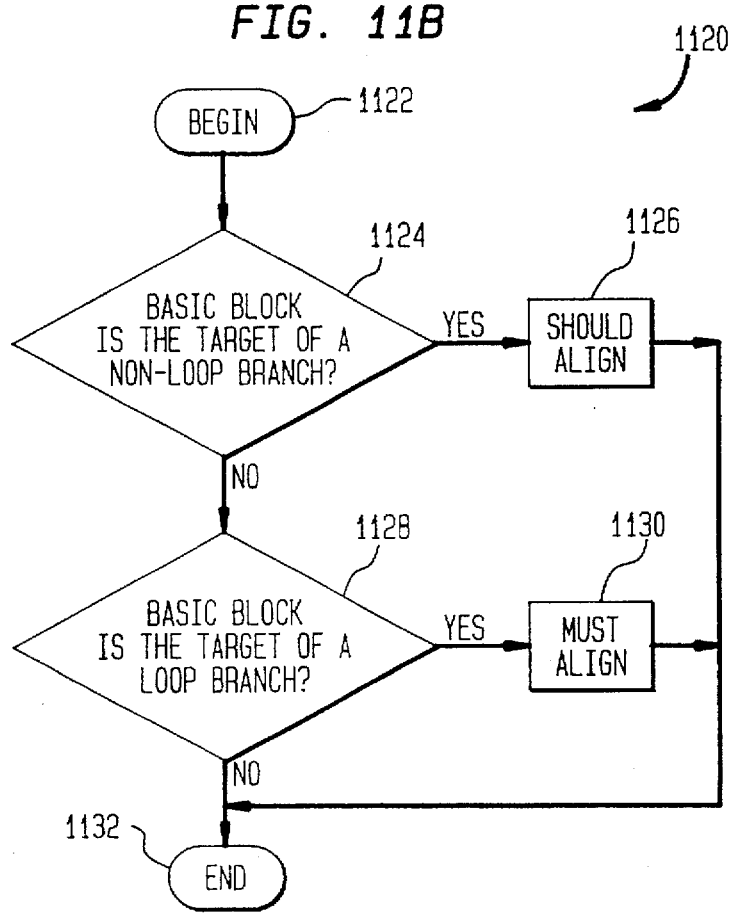

Consider an example presented in FIG. 11A where four basic blocks 1104, 1106, 1108, and 1110 are shown in program layout order. Basic block 1104 has a non-loop branch to basic block 1108, and basic block 1106 has a non-loop branch to basic block 1110. Basic block 1110 also has a loop branch to itself. As indicated in a flowchart 1120 in FIG. 11B, since basic block 1108 is the target of a non-loop branch (step 1124), the basic block 1108 should be aligned (step 1126). However, such alignment is preferred but not necessary. If it is to be aligned, then one or more no-ops can be inserted in preferably basic block 1104, or alternatively into basic block 1106. Since basic block 1110 is the target of a loop branch (step 1128), the basic block 1110 must be aligned (step 1130). Such alignment is achieved by inserting one or more no-ops in preferably basic block 1108.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A global instruction distribution unit for optimizing a source code representation comprising a plurality of basic blocks, the optimized source code representation to be executed in a target machine, the global instruction distribution unit comprising:

basic block pair selecting means for selecting from the source code representation a basic block pair comprising a source basic block and at least one target basic block;

legal instruction identifying means for identifying an instruction in said source basic block that can be moved from said source basic block to said at least one target basic block while preserving program semantics; and conditional moving means for conditionally moving one of said instruction and a representation of said instruction from said source basic block to said at least one target basic block as a function of resource utilization of the target machine that would result from a movement.

2. The global instruction distribution unit of claim 1, wherein said conditional moving means comprises:

resource usage information generating means for generating resource usage information of said at least one target basic block;

window identifying means for identifying, by reference to said resource usage information, any windows in said at least one target basic block where one of said instruction and said representation of said instruction can be inserted and executed using resources respectively unused in said any windows; and instruction moving means for moving one of said instruction and said representation of said instruction from said source basic block to one of said any windows.

3. The global instruction distribution unit of claim 2, wherein said window identifying means comprises:

means for identifying an alternate instruction that is functionally equivalent to said instruction in a context of said at least one target basic block, and that utilizes resources that are unused in one of said any windows;

wherein said instruction moving means comprises:

means for inserting said alternate instruction into said one of said any windows.

4. The global instruction distribution unit of claim 2, wherein said resource usage information generating means comprises:

means for generating resource usage information of said at least one target basic block and at least a portion of a fall through path of said at least one target basic block.

5. The global instruction distribution unit of claim 1, wherein said basic block pair selecting means comprises:

means for classifying a first basic block, a second basic block, and a third basic block of the source code representation as being a circular basic block pair if said first basic block always executes after one of said second basic block and said third basic block via a control loop that couples said first basic block to said third basic block, said first basic block being one part of said circular basic block pair, and said second and third basic blocks collectively representing another part of said circular basic block pair;

means for classifying said first and second basic blocks as being an equivalent basic block pair if said first basic block always executes after said second basic block, and said second basic block always executes before said first basic block;

means for classifying said first, second, and third basic blocks as being a code duplication basic block pair if said first basic block is always processed after one of said second basic block and said third basic block, said first basic block being one part of said code duplication basic block pair, and said second and third basic blocks collectively representing another part of said code duplication basic block pair;

means for classifying said first and second basic blocks as being a speculative basic block pair if said first basic block is sometimes processed after said second basic block; and means for assigning basic blocks from one of said circular basic block pair, said equivalent basic block pair, said code duplication basic block pair, and said speculative basic block pair as said source basic block and said at least one target basic block.

6. The global instruction distribution unit of claim 1, further comprising:

means for conditionally aligning said basic blocks of said source code representation that are targets of branch instructions.

7. A method of optimizing a source code representation comprising a plurality of basic blocks, the optimized source code representation to be executed in a target machine, the method comprising the steps of:

(1) selecting from the source code representation a basic block pair comprising a source basic block and at least one target basic block;

(2) identifying an instruction in said source basic block that can be legally moved from said source basic block to said at least one target basic block; and (3) conditionally moving one of said instruction and a representation of said instruction from said source basic block to said at least one target basic block as a function of resource utilization of the target machine that would result from a movement.

8. The method of claim 7, wherein step (1) comprises the steps of:

identifying any backward circular basic block pairs;
identifying any backward equivalent basic block pairs;
identifying any backward duplication basic block pairs;
identifying any backward speculative basic block pairs;
identifying any forward equivalent basic block pairs;
identifying any forward duplication basic block pairs; and
identifying any forward speculative basic block pairs.

9. The method of claim 8, further comprising the steps of:

processing steps (1)–(3) for each of said backward circular basic block pair, and then each of said backward equivalent basic block pair, and then each of said backward duplication basic block pair, and then each of said backward speculative basic block pair; and processing steps (1)–(3) for each of said forward equivalent basic block pair, and then each of said forward duplication basic block pair, and then each of said forward speculative basic block pair.

10. The method of claim 7, wherein step (3) comprises the steps of:

(a) generating resource usage information of said at least one target basic block;

(b) identifying, by reference to said resource usage information, any windows in said at least one target basic block where one of said instruction and said representation of said instruction can be inserted and executed using resources respectively unused in said any windows; and (c) moving one of said instruction and said representation of said instruction from said source basic block to one of said any windows.

11. The method of claim 10, wherein step (b) comprises the step of:

identifying an alternate instruction that is functionally equivalent to said instruction in a context of said at least one target basic block, and that utilizes resources that are unused in one of said any windows;

wherein step (c) comprises the step of:

inserting said alternate instruction into said one of said any windows.

12. The method of claim 10, wherein step (a) comprises the step of:

generating resource usage information of said at least one target basic block and at least a portion of a fall through path of said at least one target basic block.

13. The method of claim 7, wherein step (1) comprises the steps of:

(a) classifying a first basic block, a second basic block, and a third basic block of the source code representation as being a circular basic block pair if said first basic block always executes after one of said second basic block and said third basic block via a control loop that couples said first basic block to said third basic block, said first basic block being one part of said circular basic block pair, and said second and third basic blocks collectively representing another part of said circular basic block pair;

(b) classifying said first and second basic blocks as being an equivalent basic block pair if said first basic block always executes after said second basic block, and said second basic block always executes before said first basic block;

(c) classifying said first, second, and third basic blocks as being a code duplication basic block pair if said first basic block is always processed after one of said second basic block and said third basic block, said first basic block being one part of said code duplication basic block pair, and said second and third basic blocks collectively representing another part of said code duplication basic block pair;

(d) classifying said first and second basic blocks as being a speculative basic block pair if said first basic block is sometimes processed after said second basic block; and (e) assigning basic blocks from one of said circular basic block pair, said equivalent basic block pair, said code duplication basic block pair, and said speculative basic block pair as said source basic block and said at least one target basic block.

14. The method of claim 13, further comprising the steps of:

processing steps (1)–(3) for each of said circular basic block pair, and then each of said equivalent basic block pair, and then each of said code duplication basic block pair, and then each of said speculative basic block pair, wherein in step (3) said movement is in a backward direction; and processing steps (1)–(3) for each of said equivalent basic block pair, and then each of said code duplication basic block pair, and then each of said speculative basic block pair, wherein in step (3) said movement is in a forward direction.

15. The method of claim 7, further comprising the step of:

(4) conditionally aligning said basic blocks of said source code representation that are targets of branch instructions.

16. A computer program product comprising a computer useable medium having computer program logic recorded thereon for enabling a computer to optimize a source code representation comprising a plurality of basic blocks, resulting in an optimized source code representation to be executed in a target machine, said computer program logic comprising:

means for enabling the computer to select from the source code representation a basic block pair comprising a source basic block and at least one target basic block;

means for enabling the computer to identify an instruction in said source basic block that can be moved from said source basic block to said at least one target basic block while preserving program semantics; and means for enabling the computer to conditionally move one of said instruction and a representation of said instruction from said source basic block to said at least one target basic block as a function of resource utilization of the target machine that would result from a movement.

17. The computer program product of claim 16, wherein said means for enabling the computer to conditionally move one of said instruction and a representation of said instruction from said source basic block to said at least one target basic block as a function of resource utilization of the target machine that would result from a movement comprises:

means for enabling the computer to generate resource usage information of said at least one target basic block;

means for enabling the computer to identify, by reference to said resource usage information, any windows in said at least one target basic block where one of said instruction and said representation of said instruction can be inserted and executed using resources respectively unused in said any windows; and means for enabling the computer to move one of said instruction and said representation of said instruction from said source basic block to one of said any windows.

18. The computer program product of claim 17, wherein said means for enabling the computer to identify, by reference to said resource usage information, any windows in said at least one target basic block where one of said instruction and said representation of said instruction can be inserted and executed using resources respectively unused in said any windows comprises:

means for enabling the computer to identify an alternate instruction that is functionally equivalent to said instruction in a context of said at least one target basic block, and that utilizes resources that are unused in one of said any windows;

wherein said means for enabling the computer to move one of said instruction and said representation of said instruction from said source basic block to one of said any windows comprises:

means for enabling the computer to insert said alternate instruction into said one of said any windows.

19. The computer program product of claim 17, wherein said means for enabling the computer to generate resource usage information of said at least one target basic block comprises:

means for enabling the computer to generate resource usage information of said at least one target basic block and at least a portion of a fall through path of said at least one target basic block.

20. The computer program product of claim 16, wherein said means for enabling the computer to select from the source code representation a basic block pair comprising a source basic block and at least one target basic block comprises:

means for enabling the computer to classify a first basic block, a second basic block, and a third basic block of the source code representation as being a circular basic block pair if said first basic block always executes after one of said second basic block and said third basic block via a control loop that couples said first basic block to said third basic block, said first basic block being one part of said circular basic block pair, and said second and third basic blocks collectively representing another part of said circular basic block pair;

means for enabling the computer to classify said first and second basic blocks as being an equivalent basic block pair if said first basic block always executes after said second basic block, and said second basic block always executes before said first basic block;

means for enabling the computer to classify said first, second, and third basic blocks as being a code duplication basic block pair if said first basic block is always processed after one of said second basic block and said third basic block, said first basic block being one part of said code duplication basic block pair, and said second and third basic blocks collectively representing another part of said code duplication basic block pair;

means for enabling the computer to classify said first and second basic blocks as being a speculative basic block pair if said first basic block is sometimes processed after said second basic block; and means for enabling the computer to assign basic blocks from one of said circular basic block pair, said equivalent basic block pair, said code duplication basic block pair, and said speculative basic block pair as said source basic block and said at least one target basic block.

21. The computer program product of claim 16, wherein said computer program logic further comprises:

means for enabling the computer to conditionally align said basic blocks of said source code representation that are targets of branch instructions.

* * * * *